United States Patent
Tsou et al.

(10) Patent No.: US 9,077,249 B2
(45) Date of Patent: Jul. 7, 2015

(54) POWER CONTROLLER AND POWER MANAGEMENT CONTROL METHOD

(71) Applicant: Leadtrend Technology Corp., Hsin-Chu (TW)

(72) Inventors: Ming-Chang Tsou, Hsin-Chu (TW); Kuo-Chien Huang, Hsin-Chu (TW)

(73) Assignee: Leadtrend Technology Corp., Science-Based Industrial Park, Hsin-Chu (TW)

(*) Notice: Subject to any disclaimer, the term of this patent is extended or adjusted under 35 U.S.C. 154(b) by 227 days.

(21) Appl. No.: 13/645,457

(22) Filed: Oct. 4, 2012

(65) Prior Publication Data

US 2013/0088206 A1    Apr. 11, 2013

(30) Foreign Application Priority Data

Oct. 5, 2011    (TW) ............... 100135993 A

(51) Int. Cl.
*H02M 3/335*    (2006.01)
*H02M 1/32*    (2007.01)

(52) U.S. Cl.
CPC .......... *H02M 3/33507* (2013.01); *H02M 1/32* (2013.01)

(58) Field of Classification Search
CPC ..... H02M 1/32; H02M 3/33507; H02J 5/005; H02J 17/00; H05K 7/20254; H03K 5/1252
USPC .......... 323/222, 224, 207, 282–289; 363/21.12, 65, 45, 89, 21.04
See application file for complete search history.

(56) References Cited

U.S. PATENT DOCUMENTS

| | | | | |
|---|---|---|---|---|
| 4,683,529 A * | 7/1987 | Bucher, II | ............... | 363/44 |
| 5,535,067 A * | 7/1996 | Rooke | ............... | 360/51 |
| 6,204,649 B1 * | 3/2001 | Roman | ............... | 323/282 |
| 6,701,273 B2 * | 3/2004 | Nishigaki et al. | ............... | 702/132 |
| 7,339,861 B2 * | 3/2008 | Minamino et al. | ............... | 369/47.28 |
| 7,486,493 B2 * | 2/2009 | Yang | ............... | 361/91.1 |
| 7,504,815 B2 | 3/2009 | Moyse | | |
| 7,652,461 B2 * | 1/2010 | Tateishi | ............... | 323/284 |
| 8,102,679 B2 * | 1/2012 | Gong et al. | ............... | 363/21.12 |

FOREIGN PATENT DOCUMENTS

| | | |
|---|---|---|
| CN | 1845412 A | 10/2006 |
| CN | 201440636 U | 4/2010 |
| TW | 200713728 | 4/2007 |

\* cited by examiner

*Primary Examiner* — Rajnikant Patel
(74) *Attorney, Agent, or Firm* — Winston Hsu; Scott Margo

(57) ABSTRACT

A power controller includes a clock generator, a low-frequency clock generator, and a protection circuit. The clock generator provides a clock signal with a clock frequency for periodically switching on and off a power switch. The low-frequency clock generator provides a low-frequency clock signal with a frequency lower than the clock frequency. The protection circuit includes an over-power detection circuit and a logic circuit. The over-power detection circuit determines whether an over power event has occurred according to a feedback signal controlled by an output voltage of the power supply. When the over power event lasts longer than an over power tolerance duration, the logic circuit isolates the power switch from the clock signal to keep the power switch turned off. The over power tolerance duration is equal to a predetermined clock cycles of the low-frequency clock signal.

14 Claims, 3 Drawing Sheets

POWER CONTROLLER AND POWER MANAGEMENT CONTROL METHOD

BACKGROUND OF THE INVENTION

1. Field of the Invention

The present invention is a power controller and a power management control method related to a power supply, particularly a power controller and a control method for providing numerous ways to protect the power supply.

2. Description of the Prior Art

A power supply is an electronic device used to convert power from batteries or AC mains into specific rating to power electronic products. The power supply is required by most electronic products. Among different kinds of power supplies, switching power supply is very popular in power supply industry for possessing superior conversion efficiency and small device size.

FIG. 1 is a block diagram illustrating a prior art switching power supply utilizing flyback topology. A bridge rectifier 20 substantially rectifies power from AC mains into DC input voltage $V_{IN}$ at an input power node IN. A primary winding PRM of a transformer stores energy when a power switch 34 is turned on; a secondary winding SEC and an auxiliary winding AUX of the transformer release energy when the power switch 34 is turned off. The secondary winding SEC delivers power to a load 24 and builds up an output voltage $V_{OUT}$ at an output node OUT. Similarly, power is delivered to a power controller 26 and an operation voltage $V_{CC}$ is built up at an operation power source node VCC. A feedback circuit 30 including a photo coupler, an LT431, and so forth, generates a feedback signal $V_{FB}$ at a feedback node FB of a compensation capacitor 32 according to an output voltage $V_{OUT}$. The power controller 26 controls power conversion of the power supply according to the feedback signal $V_{FB}$. A current detection signal $V_{CS}$ at a current detection node CS is substantially corresponding to a current $I_{PRM}$ flowing through the primary winding PRM and the power switch 34 via a first and a second resistor 38, 36.

The switching power supply of FIG. 1 is usually coupled to AC mains all the time thus many protection methods are required to prevent dangerous situation resulting from fault conditions. Common protection methods include over voltage protection OVP, over current protection OCP, over load protection OLP, and so forth.

SUMMARY OF THE INVENTION

A power controller for controlling a power supply comprises a clock generator, a low frequency clock generator, and a protection circuit. The clock generator provides a clock signal with a clock frequency for periodically switching on and off a power switch. The low frequency clock generator provides a low frequency clock signal with a frequency lower than the clock frequency. The protection circuit comprises an over power detection circuit and a logic circuit. The over power detection circuit determines if an over power event has occurred according to a feedback signal controlled by an output voltage of the power supply. When the over power event lasts longer than an over power tolerance duration, the logic circuit isolates the power switch from the clock signal to keep the power switch turned off. The over power tolerance duration is equal to a predetermined number of clock cycles of the low frequency clock signal.

A power management control method comprises switching on and off a power switch periodically according to a clock signal with a clock frequency, providing a low frequency clock signal with a frequency lower than the clock frequency, determining if an over power event has occurred according to a feedback signal which is substantially controlled by an output voltage of a power supply, counting clock cycles of the low frequency clock signal after the over power event has occurred to generate a first count, and keeping the power switch turned off by isolating the power switch from the clock signal when the first count reaches a first predetermined number.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
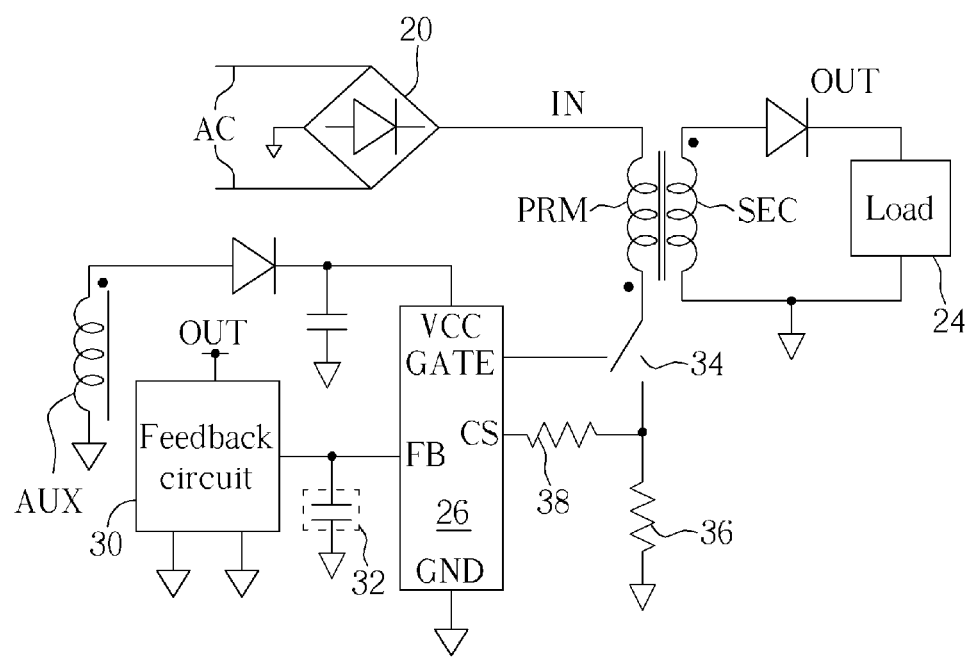
FIG. 1 is a block diagram illustrating a prior art switching power supply.
Figure 2:
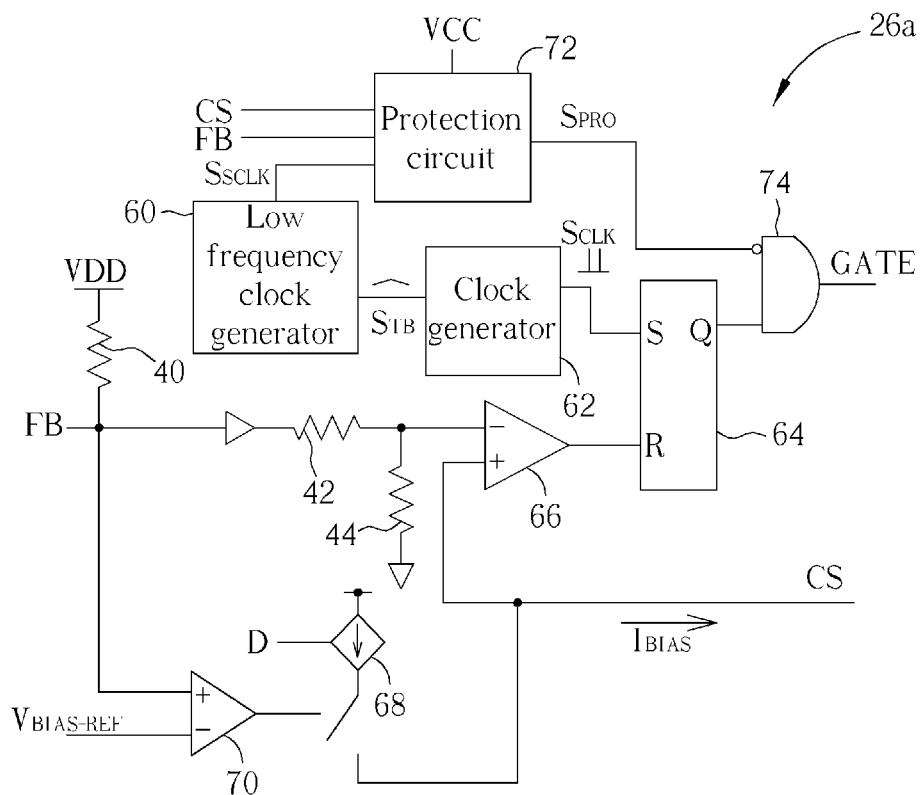
FIG. 2 is a block diagram illustrating one embodiment of a power controller of the present invention.

FIG. 2 is a block diagram illustrating one embodiment of a power controller 26a of the present invention. A power controller 26 of FIG. 1 is replaced with the power controller 26a described in detail below as a preferred embodiment of the present invention.

The power controller 26a includes a clock generator 62 and a low frequency clock generator 60. The clock generator 62 provides a clock signal $S_{CLK}$ with a clock frequency $f_{CLK}$ to set an SR flip-flop 64. The clock signal $S_{CLK}$ switches on and off a power switch 34 periodically through a gate node GATE when a protection signal $S_{PRO}$ is disasserted. The low frequency clock generator 60 provides a jitter signal $S_{TB}$ with a low clock frequency $f_{SCLK}$ to adjust the clock frequency $f_{CLK}$ periodically. For example, the jitter signal $S_{TB}$ adjusts the clock frequency $f_{CLK}$ to vary within a 65~55 KHz range periodically, the period being equal to inverse of the low clock frequency $f_{SCLK}$ which is 400 Hz. The low frequency clock generator 60 also provides a low frequency clock signal $S_{SCLK}$ with the low clock frequency $f_{SCLK}$ to a protection circuit 72.

Figure 3:
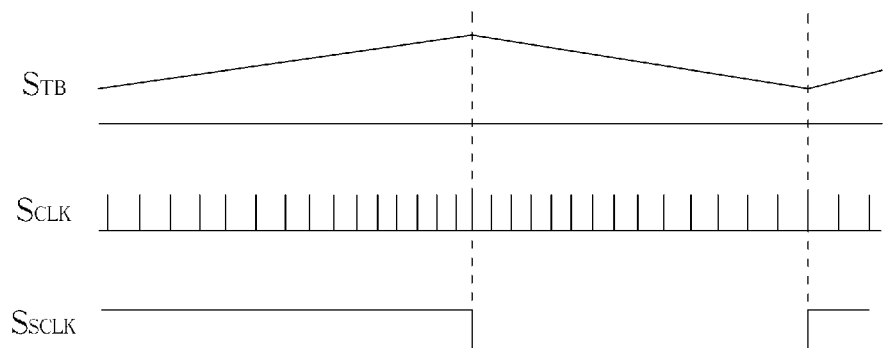
FIG. 3 is a diagram illustrating an example of signals.

FIG. 3 is a diagram illustrating the jitter signal $S_{TB}$, the clock signal $S_{CLK}$, and the low frequency clock signal $S_{SCLK}$ from top to bottom. As illustrated in FIG. 3, the higher the jitter signal $S_{TB}$ is, the higher the clock frequency $f_{CLK}$ of the clock signal $S_{CLK}$ is. In one embodiment, the low clock frequency $f_{SCLK}$ increases with the clock frequency $f_{CLK}$. For example, the low clock frequency $f_{SCLK}$ is 400 Hz when the clock frequency $f_{CLK}$ is substantially 60 KHz, and the low clock frequency $f_{SCLK}$ is 133 Hz when the clock frequency $f_{CLK}$ is substantially 20 KHz. In another embodiment, the low clock frequency $f_{SCLK}$ is independent of the clock frequency $f_{CLK}$. For example, the low clock frequency $f_{SCLK}$ is maintained at 400 Hz regardless of the clock frequency $f_{CLK}$ being 20 KHz or 60 KHz.

In FIG. 2 the protection circuit 72 detects voltages on an operation power source node VCC, a current detection node CS, and a feedback node FB so as to generate the protection signal $S_{PRO}$ according to a predetermined number of clock cycles of the low frequency clock signal $S_{SCLK}$. When the protection signal $S_{PRO}$ is asserted, a logic gate 74 isolates the power switch 34 from the clock signal $S_{CLK}$ to keep the power switch 34 turned off and consequently stops power conversion of a power supply of FIG. 1.

A compensation resistor 40 is coupled between a voltage node VDD and the feedback node FB. A feedback signal $V_{FB}$ of the feedback node FB can be substantially limited to a peak value of a current detection signal $V_{CS}$ on the current detection node CS through a first resistor 42, a second resistor 44, and a comparator 66. The feedback signal $V_{FB}$ is controlled by an output voltage $V_{OUT}$ through a feedback circuit 30.

A comparator 70 and a controllable current source 68 together alleviate a phenomenon of output power from an output node OUT drifting with an input voltage $V_{IN}$ when protection substantially occurs. In FIG. 2, when the feedback signal $V_{FB}$ is higher than a reference voltage $V_{BIAS-REF}$, the controllable current source 68 provides a bias current $I_{BIAS}$ flowing from the current detection node CS of the power controller 26a to a first resistor 38 and a second resistor 36 then to a ground node of a primary winding. The bias current $I_{BIAS}$ is generated according to a duty cycle D of the power switch 34 so as to adjust the current detection signal $V_{CS}$. The duty cycle is defined as an on time $T_{ON}$ divided by a duty period. In one embodiment, the smaller the duty cycle D is, which means the smaller the on time $T_{ON}$ of the power switch 34 is, the bigger the bias current $I_{BIAS}$ is. The bias current $I_{BIAS}$ and the first resistor 38 together alleviate the phenomenon of output power or output current from the output node OUT drifting with the input voltage $V_{IN}$ when protection substantially occurs. When the feedback signal $V_{FB}$ is lower than the reference voltage $V_{BIAS-REF}$, no current from the controllable current source 68 is able to flow to the current detection node CS, so the bias current $I_{BIAS}$ is 0. In so doing, power consumption of the power controller 26a under no load or light load can be reduced.

Figure 4:
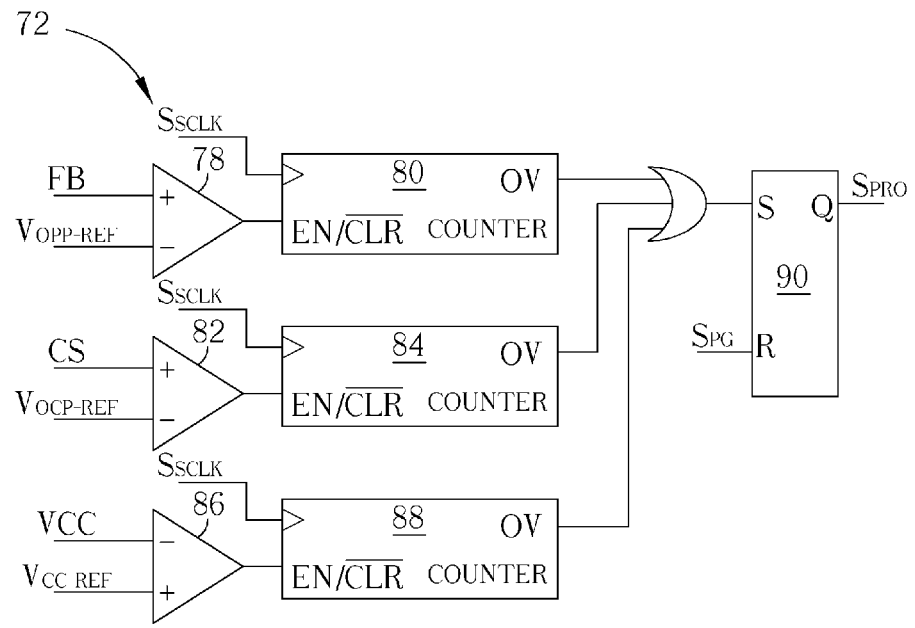
FIG. 4 is a block diagram illustrating a protection circuit adapted to the power controller of FIG. 2.

FIG. 4 is a block diagram illustrating the protection circuit 72 of FIG. 2 including first, second, and third comparators 78, 82, 86, first, second, and third counters 80, 84, 88, and an SR flip-flop 90. When an operation voltage $V_{CC}$ of the power controller 26a reaches a predetermined voltage, a power good signal $S_{PG}$ sets an initial state of the protection signal $S_{PRO}$ from the SR flip-flop 90 to be disasserted.

The first comparator 78 is an over power detection circuit for determining if an over power event has occurred by comparing the feedback signal $V_{FB}$ and an over power reference voltage $V_{OPP-REF}$. When the feedback signal $V_{FB}$ is lower than the over power reference voltage $V_{OPP-REF}$, the over power event fails to occur and the counter 80 is cleared or reset to 0. The feedback signal $V_{FB}$ rises as a load 24 increases. When the feedback signal $V_{FB}$ is higher than the over power reference voltage $V_{OPP-REF}$, the over power event occurs and the counter 80 starts to count clock cycles of the low frequency clock signal $S_{SCLK}$. When the counter 80 counts to a predetermined number of clock cycles, which means the over power event lasts longer than an over power tolerance duration, the counter 80 asserts the protection signal $S_{PRO}$ through the SR flip-flop 90 so as to keep the power switch 34 turned off. The over power tolerance duration is determined by counting clock cycles of the low frequency clock signal $S_{SCLK}$.

Similarly, the second comparator 82 is an over current detection circuit for determining if an over current event has occurred by comparing the current detection signal $V_{CS}$ and an over current reference voltage $V_{OCP-REF}$. When the load 24 increases to raise the feedback signal $V_{FB}$, the peak value of the current detection signal $V_{CS}$ also rises. When the current detection signal $V_{CS}$ is higher than the over current reference voltage $V_{OCP-REF}$, the over power event occurs and the counter 84 starts to count clock cycles of the low frequency clock signal $S_{SCLK}$. When the counter 84 counts to a predetermined number of clock cycles, which means the over current event lasts longer than an over current tolerance duration, the counter 84 asserts the protection signal $S_{PRO}$ so as to keep the power switch 34 turned off. The over current tolerance duration is determined by counting clock cycles of the low frequency clock signal $S_{SCLK}$.

In one embodiment the clock frequency $f_{CLK}$ is substantially 60 KHz when the over current event substantially occurs, and the clock frequency $f_{CLK}$ is substantially 120 KHz when the over power event substantially occurs.

The third comparator 86 is a low voltage detection circuit for determining if a low voltage event has occurred by comparing the operation voltage $V_{CC}$ and a low voltage reference $V_{CC-REF}$. When the load 24 is short circuited suddenly, energy stored in a transformer has no way to be released. The operation voltage $V_{CC}$ drops with time for losing power source from the transformer. So the operation $V_{CC}$ is regarded as a signal to trigger corresponding protection method. A low voltage event occurs when the operation voltage $V_{CC}$ is lower than the low voltage reference $V_{CC-REF}$ and the counter 88 starts to count clock cycles of the low frequency clock signal $S_{SCLK}$. When the counter 88 counts to a predetermined number of clock cycles, which means the low voltage event lasts longer than a low voltage tolerance duration, the counter 88 asserts the protection signal $S_{PRO}$ so as to keep the power switch 34 turned off. The low voltage tolerance duration is determined by counting clock cycles of the low frequency clock signal $S_{SCLK}$.

Figure 5:
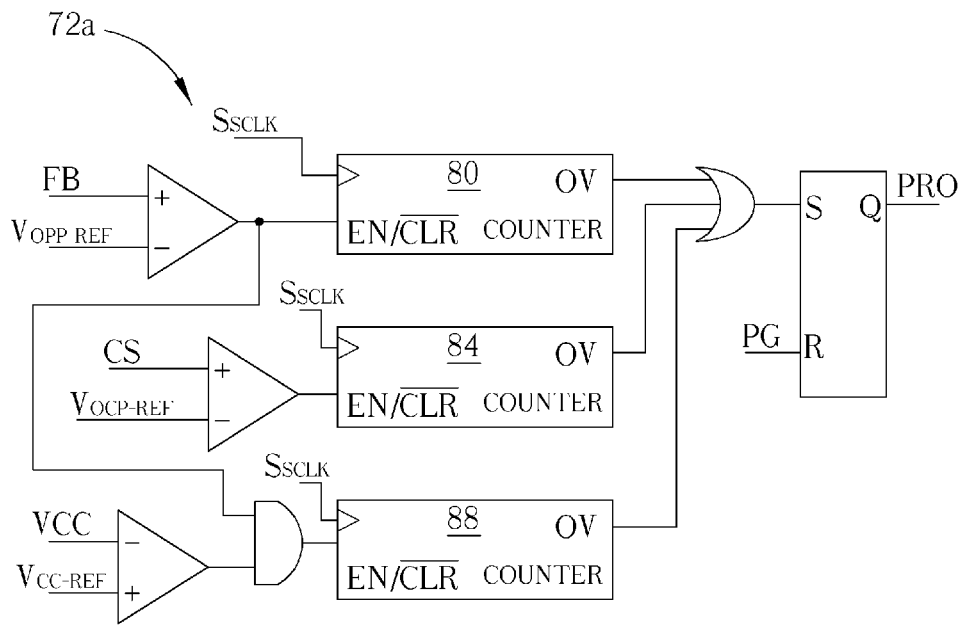
FIG. 5 is a block diagram illustrating another protection circuit adapted to the power controller of FIG. 2.

As illustrated in FIG. 4, the protection signal $S_{PRO}$ is asserted when any one of the over power event, the over current event, and the low voltage event lasts longer than their respective tolerance duration. Protection methods include but not limited to the embodiment of FIG. 4. In another embodiment, the protection signal $S_{PRO}$ is asserted when all of the over power event, the over current event, and the low voltage event last longer than their respective durations. FIG. 5 is a block diagram illustrating a protection circuit 72a of another embodiment to replace the protection circuit 72. In FIG. 5, the counter 88 only starts to count when both of the low voltage event and the over power event have occurred. In another embodiment of the present invention with similar protection method used in FIG. 5, the counter only starts to count when both of the low voltage event and the over current event have occurred by coupling an output of the second comparator 82 and an output of the third comparator 86 of FIG. 4 to an AND gate and then to the counter 88.

Circuit implementation cost is effectively reduced by utilizing the low frequency clock signal $S_{SCLK}$. Over power protection, over current protection, and low voltage protection are usually triggered several mini-seconds after fault conditions have occurred. For example, if the over power protection is triggered 10 mini-seconds after the over power event has occurred, only two D flip-flops will be needed for the counter to count 4 times according to the low frequency clock signal $S_{SCLK}$ with 400 Hz. Instead, nine D flip-flops will be needed for the counter to count 600 times according to the clock signal $S_{CLK}$ with 60 KHZ. Thus by utilizing the low frequency clock signal $S_{SCLK}$, the circuit implementation cost is reduced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A power controller for controlling a power supply comprising:
   a clock generator for providing a clock signal with a clock frequency for periodically switching on and off a power switch;
   a low frequency clock generator for providing a low frequency clock signal with a frequency lower than the clock frequency; and
   a protection circuit comprising:
      an over power detection circuit for determining if an over power event has occurred according to a feedback signal substantially controlled by an output voltage of the power supply; and
      a logic circuit for keeping the power switch turned off by isolating the power switch from the clock signal when the over power event lasts longer than an over power tolerance duration, the over power tolerance duration being equal to a first predetermined number of clock cycles of the low frequency clock signal.

2. The power controller of claim 1 wherein the power supply comprises an inductor, the protection circuit further comprising:
   an over current detection circuit for determining if an over current event has occurred according to a current detection signal substantially corresponding to a current flowing through the inductor;
   wherein the logic circuit keeps the power switch turned off by isolating the power switch from the clock signal when the over current event lasts longer than an over current tolerance duration, the over current tolerance duration being equal to a second predetermined number of clock cycles of the low frequency clock signal.

3. The power controller of claim 2 wherein the clock frequency is a first clock frequency when the over power event has substantially occurred, the clock frequency is a second clock frequency when the over current event has substantially occurred, and the first clock frequency is substantially two times the second clock frequency.

4. The power controller of claim 1 wherein the power controller is powered by an operation power source, the protection circuit further comprising:
   a low voltage detection circuit for determining if a low voltage event has occurred according to an operation voltage of the operation power source;
   wherein the logic circuit keeps the power switch turned off by isolating the power switch from the clock signal when the low voltage event lasts longer than a low voltage tolerance duration, the low voltage tolerance duration being equal to a second predetermined number of clock cycles of the low frequency clock signal.

5. The power controller of claim 1 wherein the power supply comprises an inductor, the power controller further comprising:
   a current detection node for detecting a current flowing through the inductor; and
   a controllable current source for providing a bias current flowing from the current detection node of the power controller according to a duty cycle of the power switch.

6. The power controller of claim 5 wherein the bias current is fixed at 0 when the feedback signal is lower than a predetermined value.

7. The power controller of claim 1 wherein the low frequency clock generator is a jitter controller for adjusting the clock frequency periodically.

8. The power controller of claim 7 wherein the frequency of the low frequency clock signal increases with the clock frequency.

9. The power controller of claim 7 wherein the frequency of the low frequency clock signal is independent of the clock frequency.

10. A power management control method comprising:
    switching on and off a power switch periodically according to a clock signal with a clock frequency;
    providing a low frequency clock signal with a frequency lower than the clock frequency;
    determining if an over power event has occurred according to a feedback signal substantially controlled by an output voltage of a power supply;
    counting clock cycles of the low frequency clock signal after the over power event has occurred to generate a first count; and
    keeping the power switch turned off by isolating the power switch from the clock signal when the first count reaches a first predetermined number.

11. The power management control method of claim 10 further comprising:
    generating a current detection signal according to a current flowing through an inductor;
    determining if an over current event has occurred according to the current detection signal;
    counting clock cycles of the low frequency clock signal after the over current event has occurred to generate a second count; and
    keeping the power switch turned off by isolating the power switch from the clock signal when the second count reaches a second predetermined number.

12. The power management control method of claim 10 further comprising:
    providing an operation power source to power a power controller;
    determining if a low voltage event has occurred according to an operation voltage of the operation power source;
    counting clock cycles of the low frequency clock signal after the low voltage event has occurred to generate a second count; and
    keeping the power switch turned off by isolating the power switch from the clock signal when the second count reaches a second predetermined number.

13. The power management control method of claim 10 further comprising:
    generating a current detection signal according to a current flowing through an inductor; and
    adjusting the current detection signal according to a duty cycle of the power switch.

14. The power management control method of claim 10 further comprising:
    adjusting the clock frequency according to the frequency of the low frequency clock signal periodically.

* * * * *